United States Patent
Cuffel

(10) Patent No.: US 8,307,865 B1
(45) Date of Patent: Nov. 13, 2012

(54) PALM TREE TRIMMING SYSTEM

(76) Inventor: Joe Cuffel, St. Petersburg, FL (US)

( * ) Notice: Subject to any disclaimer, the term of this patent is extended or adjusted under 35 U.S.C. 154(b) by 223 days.

(21) Appl. No.: 12/802,887

(22) Filed: Jun. 16, 2010

(51) Int. Cl.
*A01G 23/00* (2006.01)

(52) U.S. Cl. .................. 144/24.1; 144/208.1; 144/208.2; 144/208.8

(58) Field of Classification Search .................. 144/24.1, 144/208.1–208.93
See application file for complete search history.

(56) References Cited

U.S. PATENT DOCUMENTS

| | | | |
|---|---|---|---|
| 3,117,401 A * | 1/1964 | Talley | 451/415 |
| 6,474,377 B1 * | 11/2002 | Van De Mortel | 144/24.13 |
| 7,422,041 B2 * | 9/2008 | Smith et al. | 144/343 |
| 7,997,311 B2 * | 8/2011 | Prout, Jr. | 144/208.2 |
| 2009/0277536 A1 * | 11/2009 | Scott | 144/24.13 |

* cited by examiner

*Primary Examiner* — Bena Miller

(57) ABSTRACT

A collar is positionable around a trunk of a palm tree. The upper section has an annular track and a slot. Each drive wheel has a motor and a bracket with a lower end that supports a drive wheel. The upper end of each bracket is coupled to the collar with a spring. A saw is positioned above the collar. A saw motor is provided. A radial positioning assembly includes a plurality of arms that couple the saw, the collar and motors to vary the position of the saw. A circumferential positioning assembly includes a trolley. The trolley has wheels and a motor to move the trolley along the track. The lower end of the lower arm extends upwardly through the slot and is coupled to the trolley. A controller has switches to control the motor. Further in this manner the positioning and activating of the saw is controlled.

2 Claims, 4 Drawing Sheets

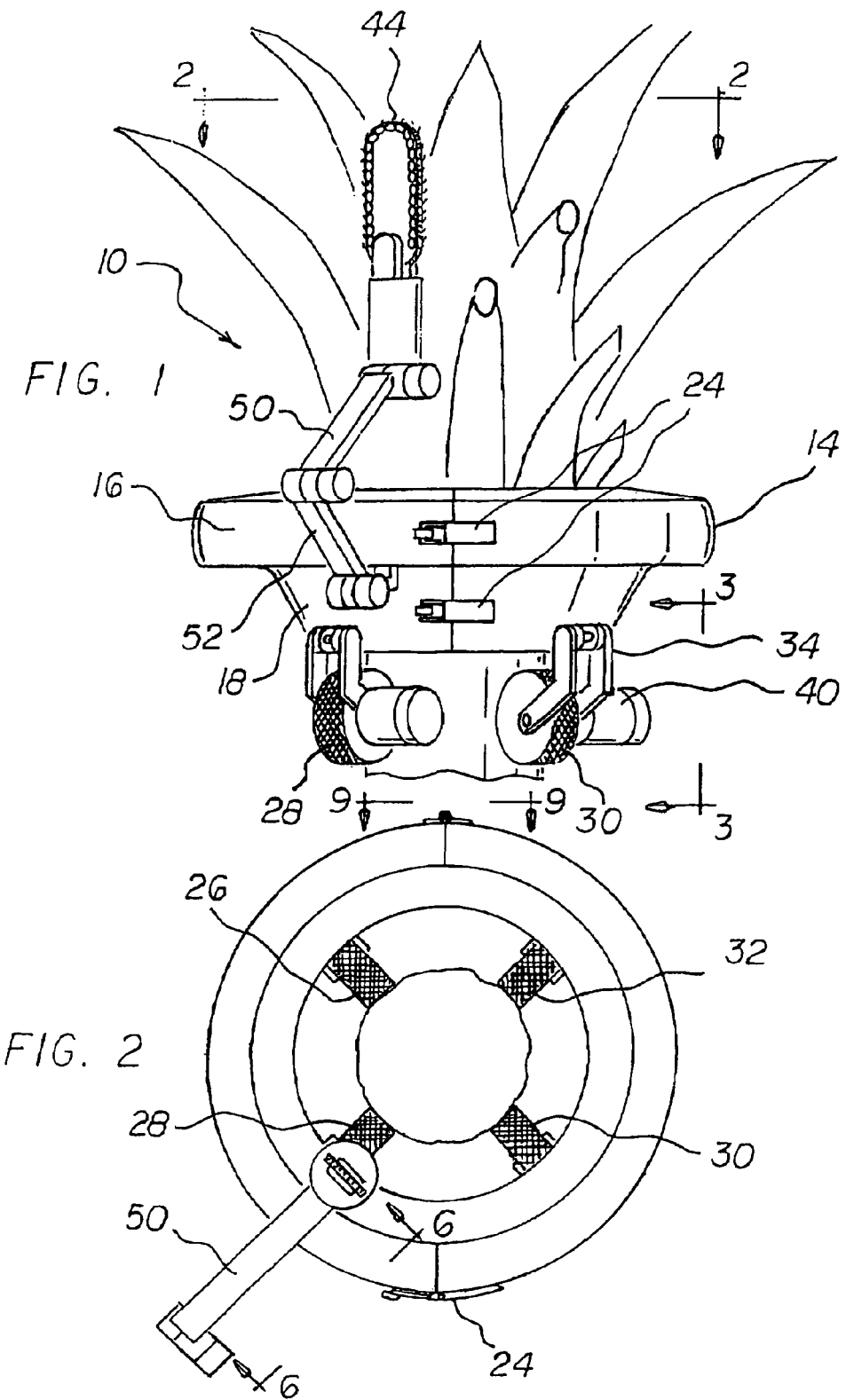

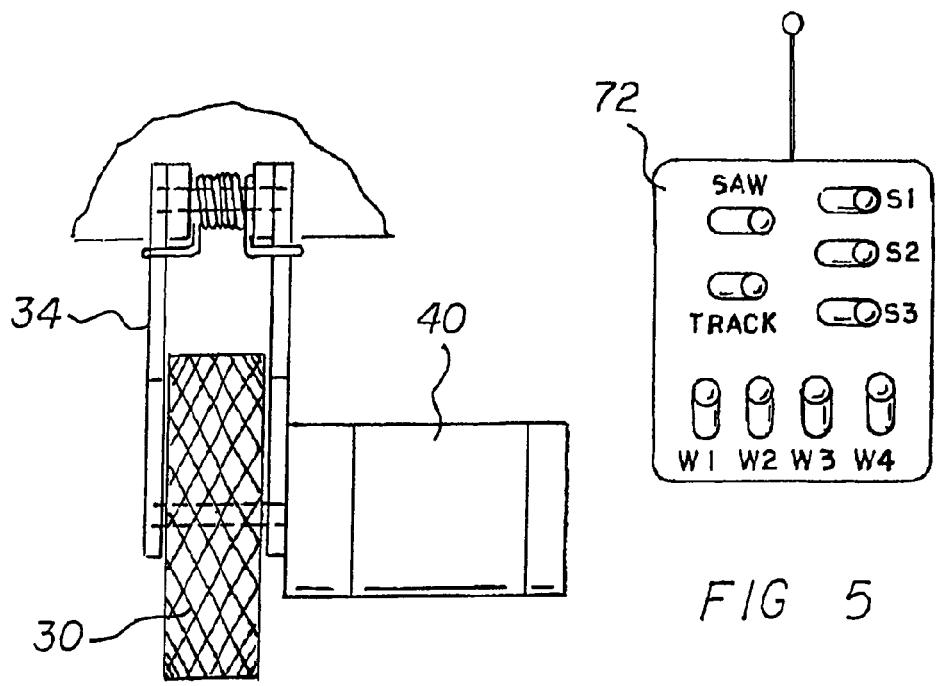
FIG 3
FIG 5
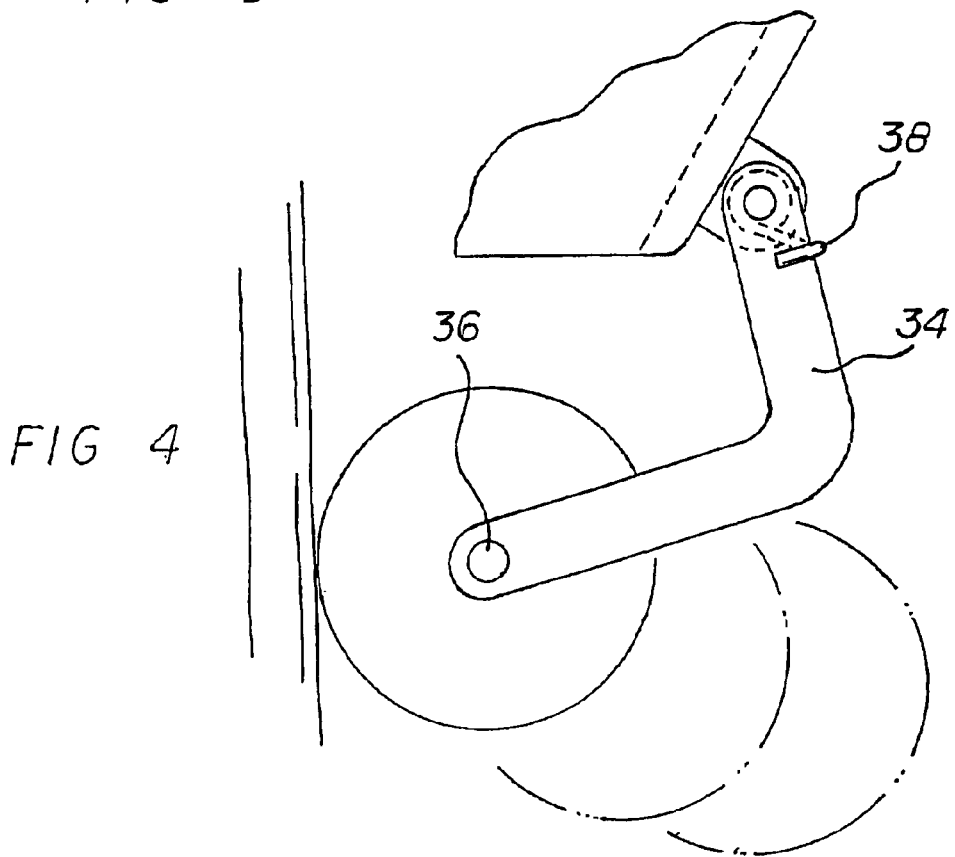
FIG 4

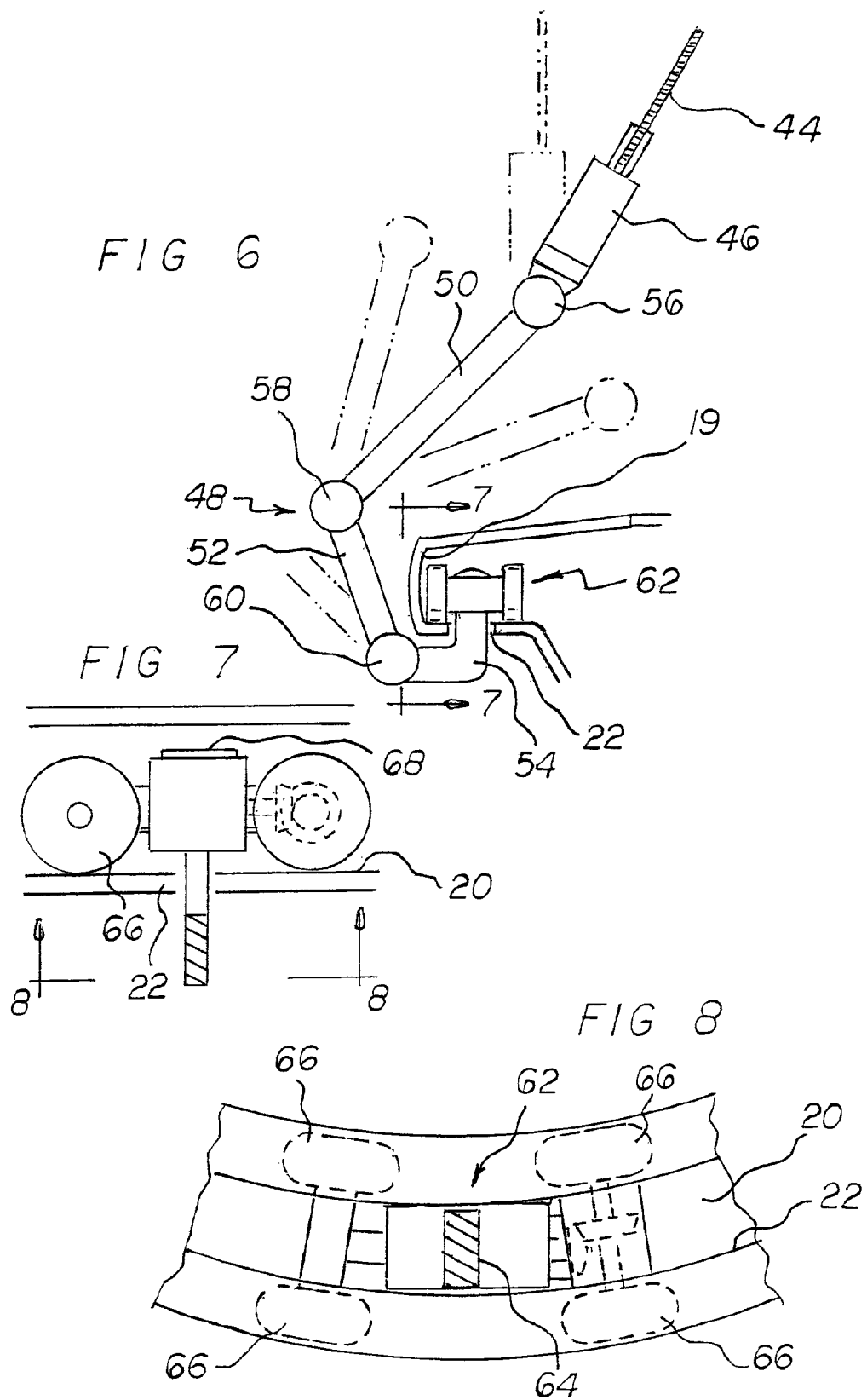

PALM TREE TRIMMING SYSTEM

BACKGROUND OF THE INVENTION

Field of the Invention

The present invention relates to a palm tree trimming system and more particularly pertains to remote control cutting elevated fronds of a palm tree, the cutting being done in a safe, convenient and economical manner.

SUMMARY OF THE INVENTION

In view of the foregoing disadvantages inherent in the known types of tree trimming systems of known designs and configurations now present in the prior art, the present invention provides an improved palm tree trimming system. As such, the general purpose of the present invention, which will be described subsequently in greater detail, is to provide a new and improved palm tree trimming system and method which has all the advantages of the prior art and none of the disadvantages.

To attain this, the present invention essentially comprises a palm tree trimming system. First provided is a collar. The collar is positionable around a trunk of a palm tree with fronds to be trimmed. The collar is annular in configuration. The collar has an inner diameter. The inner diameter is greater than the palm tree to be trimmed. The collar has an enlarged upper section. The collar has a lower section. The lower section is in an inverted frusto-conical configuration. The upper section has an interior housing. The interior housing has an annular track. The annual track has a downwardly facing circular slot. The collar is preferably formed of two semi-circular parts. Each semi-circular part has a first end and a second end. The first ends are coupled together and the second ends are coupled together. In the preferred embodiment, the coupling of the first ends is by way of two separable hinges and the coupling of the second ends is by way of two latch clamps.

Four similarly configured drive wheels are provided. Each drive wheel has an elastomeric, frictional surface. Each drive wheel has an associated bracket. Each bracket has a lower end. The lower end has an axle. The axle supports an associated drive wheel. In this manner each drive wheel may independently rotate around a horizontal axis of rotation. Each bracket has an upper end. The upper end has a spring. The spring pivotally urges the bracket and its associated drive wheel into contact with the palm tree at equally spaced circumferential locations. A remotely controlled elevator motor is provided. The elevator motor is attached to each drive wheel.

Provided next is a chain saw. The chain saw is positioned above the collar. A remotely controlled saw motor is provided. The saw motor activates and inactivates the chain saw.

A radial positioning assembly is provided next. The radial positioning assembly includes an upper arm. The radial positioning assembly includes a middle arm. The radial positioning assembly also includes a lower arm. The upper arm and middle arms are provided in a linear configuration. The upper arm has an upper end. The upper end of the upper arm pivotally couples the saw and the upper arm. A remotely controlled upper servo-motor is provided. The upper servo-motor is provided between the saw and the upper arm. In this manner the angular orientation of the saw may be varied. The middle arm is provided between the upper and lower arms. A remotely controlled middle servo-motor is provided. The middle servo-motor is provided between the middle and the upper arms. In this manner the elevational orientation of the saw may be varied. The lower arm is in a J-shaped configuration. The lower arm is coupled to the middle arm. The lower arm has an upwardly facing terminal end. A remotely controlled lower servo-motor is provided. The lower servo-motor is provided between the middle and the lower arms. In this manner the radial orientation of the saw may be varied.

Further provided is a circumferential positioning assembly. The circumferential positioning assembly includes a trolley. The trolley has four wheels. The trolley is located within the housing. In this manner the trolley may move along the track with its wheels spanning the slot. The lower end of the lower arm extends upwardly through the circular slot. The lower end of the lower arm is coupled to the trolley. A remotely controlled circumferential motion motor is provided. The circumferential motion motor is coupled to the wheels of the trolley. In this manner the trolley may be driven in the track. Further in this manner the circumferential positioning of the saw may be varied. The wheels are preferably turned slightly to accommodate the curvature of the track.

Provided last is a hand held controller. The controller has four drive wheel switches, W-1, W-2, W-3, W-4. The drive wheel switches are independently controllable. In this manner the saw may be raised and lowered. The controller has three servo-motor switches, S-1, S-2, S-3. The servo-motor switches are independently controllable. In this manner the radial and angular positioning of the saw may be varied. The controller has one track switch. The track switch is independently controllable. In this manner the circumferential orientation of the saw may be varied. The controller has one saw switch. The saw switch is independently controllable. In this manner the saw may be activated and inactivated. An optional feature is a plurality of tether lines depending from the system coupled by clips to the elevator motors. The tether lines terminate into a common single line. In this manner the system may be retrieved in the event of a malfunction.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved palm tree trimming system which has all of the advantages of the prior art tree trimming systems of known designs and configurations and none of the disadvantages.

It is another object of the present invention to provide a new and improved palm tree trimming system which may be easily and efficiently manufactured and marketed.

It is further object of the present invention to provide a new and improved palm tree trimming system which is of durable and reliable constructions.

An even further object of the present invention is to provide a new and improved palm tree trimming system which is susceptible of a low cost of manufacture with regard to both materials and labor, and which accordingly is then susceptible of low prices of sale to the consuming public, thereby making such palm tree trimming system economically available to the buying public. The invention has universal application and can be manufactured at a variety of grade levels for use from residential to commercial.

Even still another object of the present invention is to provide a palm tree trimming system for remote control cutting elevated fronds of a palm tree, the cutting being done in a safe, convenient and economical manner. It is designed to be operated by one user safely and requires only minimal instruction and practice. As such, the present invention significantly reduces the chance of injury to a user as well as damage to surrounding trees, shrubbery and structures. Note should be taken that the present methods of trimming palm trees involve a user being precariously perched at the top of a ladder, perhaps 35 feet in the air or more, while attempting to trim the palm tree using a chain saw. Accordingly, an important aspect of this invention is the dramatic reduction in exposure, risk and liability to both property owners and users of the invention, particularly in the present-day litigious society.

Lastly, it is an object of the present invention to provide a new and improved palm tree trimming system. A collar is positionable around a trunk of a palm tree. The upper section has an annular track and a slot. Each drive wheel has a motor and a bracket with a lower end that supports a drive wheel. The upper end of each bracket is coupled to the collar with a spring. A saw is positioned above the collar. A saw motor is provided. A radial positioning assembly includes a plurality of arms that couple the saw, the collar and motors to vary the position of the saw. A circumferential positioning assembly includes a trolley. The trolley has wheels and a motor to move the trolley along the track. The lower end of the lower arm extends upwardly through the slot and is coupled to the trolley. A controller has switches to control the motor. Further in this manner the positioning and activating of the saw is controlled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a palm tree trimming system constructed in accordance with the principles of the present invention.

FIG. 2 is a plan view of the system taken along line 2-2 of FIG. 1.

FIG. 3 is a side elevational view taken along line 3-3 of FIG. 1.

FIG. 4 is a front elevational view of the components shown in FIG. 3.

FIG. 5 is a plan view of the controller used in the present invention.

FIG. 6 is a cross sectional view taken along line 6-6 of FIG. 2.

FIG. 7 is a cross sectional view taken along line 7-7 of FIG. 6.

FIG. 8 is a cross sectional view taken along line 8-8 of FIG. 7.

The same reference numerals refer to the same parts throughout the various Figures.

DESCRIPTION OF THE PREFERRED EMBODIMENT

Figure 9:
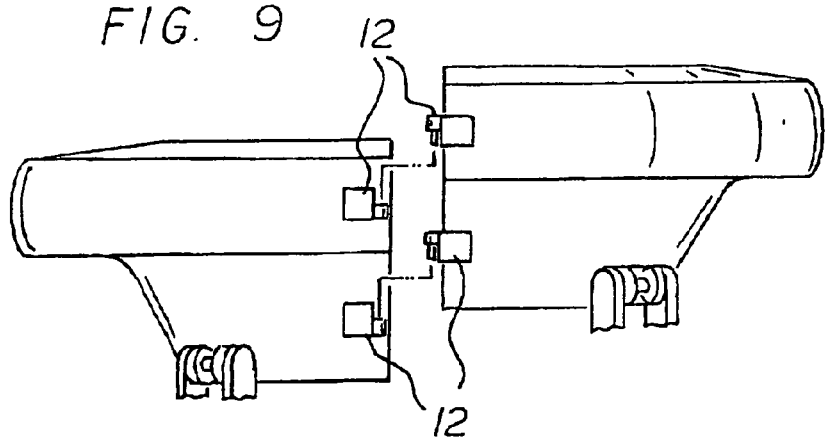
FIG. 9 is an exploded view showing the separable hinges coupling the first ends of the collar.
Figure 10:
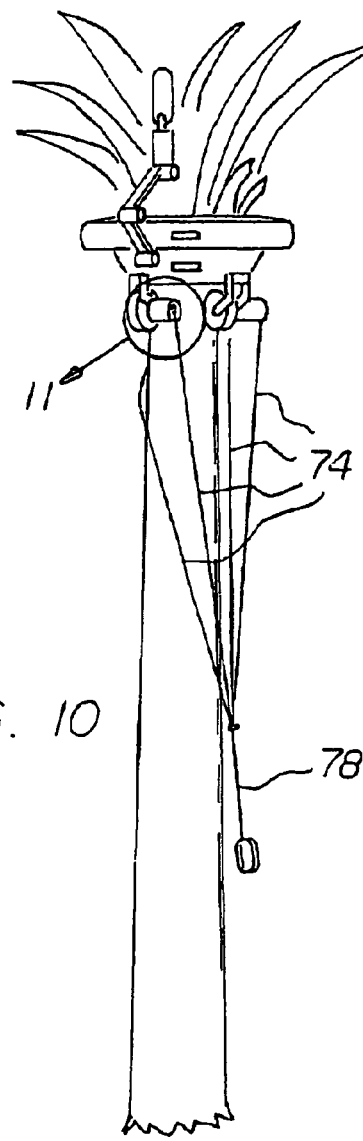
FIG. 10 is a perspective view of the system showing the tether lines.
Figure 11:
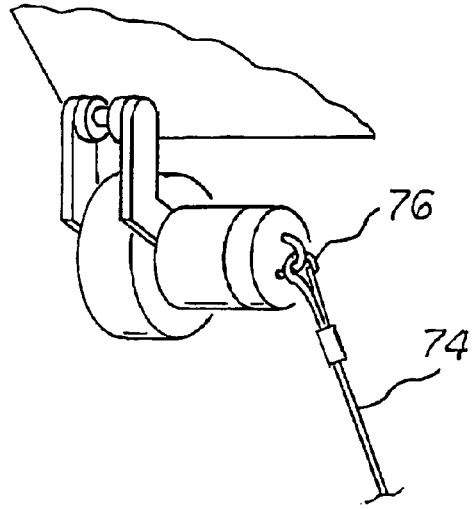
FIG. 11 is a perspective view showing taken at circle 11 of FIG. 10 showing a tether line clipped to an elevator motor.

With reference now to the drawings, and in particular to FIG. 1 thereof, the preferred embodiment of the new and improved palm tree trimming system embodying the principles and concepts of the present invention and generally designated by the reference numeral 10 will be described.

The present invention, the palm tree trimming system 10 is comprised of a plurality of components. Such components in their broadest context include a collar, drive wheels, a saw, a radial positioning assembly, a circumferential positioning assembly, and a controller. Such components are individually configured and correlated with respect to each other so as to attain the desired objective.

First provided is a collar 14. The collar is positionable around a trunk of a palm tree with fronds to be trimmed. The collar is annular in configuration. The collar has an inner diameter. The inner diameter is greater than the palm tree to be trimmed. The collar has an enlarged upper section 16. The collar has a lower section 18. The lower section is in an inverted frusto-conical configuration. The upper section has an interior housing 19. The interior housing has an annular track 20. The annular track has a downwardly facing circular slot 22. The collar is preferably formed of two semi-circular parts. Each semi-circular part has a first end and a second end. The first ends are coupled together and the second ends are coupled together. In the preferred embodiment, the coupling of the first ends is by way of two separable hinges (12) and the coupling of the second ends is by way of two latch clamps (24). It should be understood that in other embodiments of the invention, the coupling can be accomplished using a plurality of and variety of coupling means, such as, but not limited to, bolt and wing nut assemblies, and the like.

Four similarly configured drive wheels 26, 28, 30, 32 are provided. Each drive wheel has an elastomeric, frictional surface. Each drive wheel has an associated bracket 34. Each bracket has a lower end. The lower end has an axle 36. The axle supports an associated drive wheel. In this manner each drive wheel may independently rotate around a horizontal axis of rotation. Each bracket has an upper end. The upper end has a spring 38. The spring pivotally urges the bracket and its associated drive wheel into contact with the palm tree at equally spaced circumferential locations. A remotely controlled elevator motor 40 is provided. The elevator motor is attached to each drive wheel.

Provided next is a chain saw 44. The chain saw is positioned above the collar. A remotely controlled saw motor 46 is provided. The saw motor activates and inactivates the chain saw.

A radial positioning assembly 48 is provided next. The radial positioning assembly includes an upper arm 50. The radial positioning assembly includes a middle arm 52. The radial positioning assembly also includes a lower arm 54. The upper arm and middle arms are provided in a linear configuration. The upper arm has an upper end. The upper end of the upper arm pivotally couples the saw and the upper arm. A remotely controlled upper servo-motor 56 is provided. The upper servo-motor is provided between the saw and the upper arm. In this manner the angular orientation of the saw may be varied. The middle arm is provided between the upper and lower arms. A remotely controlled middle servo-motor 58 is provided. The middle servo-motor is provided between the middle and the upper arms. In this manner the elevational orientation of the saw may be varied. The lower arm is in a J-shaped configuration. The lower arm is coupled to the middle arm. The lower arm has an upwardly facing terminal end. A remotely controlled lower servo-motor 60 is provided. The lower servo-motor is provided between the middle and the lower arms. In this manner the radial orientation of the saw may be varied.

Further provided is a circumferential positioning assembly 62. The circumferential positioning assembly includes a trolley 64. The trolley has four wheels 66. The trolley is located within the housing. In this manner the trolley may move along the track with its wheels spanning the slot. The lower end of the lower arm extends upwardly through the circular slot. The lower end of the lower arm is coupled to the trolley. A remotely controlled circumferential motion motor 68 is provided. The circumferential motion motor is coupled to the wheels of the trolley. In this manner the trolley may be driven in the track. Further in this manner the circumferential positioning of the saw may be varied. The wheels are preferably turned slightly to accommodate the curvature of the track.

Provided last is a hand held controller 72. The controller has four drive wheel switches, W-1, W-2, W-3, W-4. The drive wheel switches are independently controllable. In this manner the saw may be raised and lowered. The controller has two servo-motor switches, S-1, S-2, S-3. The servo-motor switches are independently controllable. In this manner the radial and angular positioning of the saw may be varied. The controller has one track switch. The track switch is independently controllable. In this manner the circumferential orientation of the saw may be varied. The controller has one saw switch. The saw switch is independently controllable. In this manner the saw may be activated and inactivated. An optional feature is a plurality of tether lines 74 depending from the system. As shown in FIG. 1 of the drawings, the preferred attachment of the tether lines is by the use of clips 76 coupling the tether lines to the elevator motors. The tether lines terminate into common single line 78 after 3 to 4 feet. It should be understood, however, that the tether lines can be attached to other elements of the system. In this manner the system may be retrieved in the event of a malfunction.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A palm tree trimming system (10) for remote control cutting elevated fronds of a palm tree, the cutting being done in a safe, convenient and economical manner, the system comprising, in combination:

a collar (14) formed of two semi-circular parts, each semi-circular part having a first end and a second end, the first ends being coupled by at least one separable hinge (12) and the second ends being coupled by at least one latch clamp (24), the collar being positionable around a trunk of a palm tree with fronds to be trimmed, the collar being annular in configuration with an inner diameter greater than the palm tree to be trimmed, the collar being formed with an enlarged upper section (16) and a lower section (18) of an inverted frusto-conical configuration, the upper section being formed with an interior housing (19), the interior housing including an annular track (20) with a downwardly facing circular slot (22);

four similarly configured drive wheels (26), (28), (30), (32) each drive wheel being formed with an elastomeric, frictional surface, each drive wheel having an associated bracket (34), each bracket having a lower end with an axle (36) supporting an associated drive wheel for independent rotation around a horizontal axis of rotation, each bracket having an upper end with a spring (38) pivotally urging the bracket and its associated drive wheel into contact with the palm tree at equally spaced circumferential locations, a remotely controlled elevator motor (40) attached to each drive wheel;

a chain saw (44) positioned above the collar, a remotely controlled saw motor (46) for activating an inactivation the chain saw;

a radial positioning assembly (48) including an upper arm (50) and a middle arm (52) and a lower arm (54), the upper arm and middle arms being in a linear configuration, the upper arm having an upper end pivotally coupling the saw and the upper arm, a remotely controlled upper servo-motor (56) between the saw and the upper arm for varying the angular orientation of the saw, the middle arm being between the upper and lower arms, a remotely controlled middle servo-motor (58) between the middle and the upper arms for varying the elevational orientation of the saw, the lower arm being in a J-shaped configuration and coupled to the middle arm and with an upwardly facing terminal end, a remotely controlled lower servo-motor (60) between the middle and the lower arms for varying the radial orientation of the saw;

a circumferential positioning assembly (62) including trolley (64) with four wheels (66), the trolley being located within the interior housing for movement along the track with its wheels spanning the slot, the lower end of the lower arm extending upwardly through the circular slot and coupled to the trolley, a remotely controlled circumferential motion motor (68) coupled to the wheels of the trolley for driving the trolley in the track and for varying the circumferential positioning of the saw; and a hand held controller (72), the controller having four drive wheel switches, (W-1), (W-2), (W-3), (W-4) independently controllable for raising and lowering the saw, the controller having two servo-motor switches, (S-1), (S-2), (S-3) independently controllable for varying the radial and angular positioning of the saw, the controller having one track switch independently controllable for varying the circumferential orientation of the saw, the controller having one saw switch independently controllable for varying the activation and inactivation of the saw.

2. The system as set forth in claim 1 and further including a plurality of tether lines (74) coupled by clips (76) to the system, the tether lines terminating into a common single line (78).

* * * * *